United States Patent
Myers et al.

(10) Patent No.: US 8,752,389 B2
(45) Date of Patent: Jun. 17, 2014

(54) FUEL NOZZLE ASSEMBLY FOR USE WITH A GAS TURBINE ENGINE AND METHOD OF ASSEMBLING SAME

(75) Inventors: Geoffrey D. Myers, Simpsonville, SC (US); Scott Simmons, Greenville, SC (US); Stephen R. Thomas, Simpsonville, SC (US); Donald Mark Bailey, Greenville, SC (US)

(73) Assignee: General Electric Company, Schenectady, NY (US)

( * ) Notice: Subject to any disclaimer, the term of this patent is extended or adjusted under 35 U.S.C. 154(b) by 674 days.

(21) Appl. No.: 12/265,233

(22) Filed: Nov. 5, 2008

(65) Prior Publication Data

US 2010/0107639 A1   May 6, 2010

(51) Int. Cl.
F02C 1/00 (2006.01)

(52) U.S. Cl.
USPC ............................. 60/772; 60/742

(58) Field of Classification Search
USPC ................... 60/737, 740, 742, 746–748, 772
See application file for complete search history.

(56) References Cited

U.S. PATENT DOCUMENTS

| | | | |
|---|---|---|---|
| 4,258,544 A | | 3/1981 | Gebhart et al. |
| 4,735,044 A | * | 4/1988 | Richey et al. ............. 60/742 |
| 5,307,635 A | | 5/1994 | Graves et al. |
| 5,449,286 A | * | 9/1995 | Snyder et al. ................ 431/9 |
| 6,276,141 B1 | * | 8/2001 | Pelletier ..................... 60/740 |
| 6,761,035 B1 | | 7/2004 | Mueller |
| 6,915,638 B2 | * | 7/2005 | Runkle et al. .............. 60/740 |
| 6,926,496 B2 | | 8/2005 | Ackermann et al. |
| 7,024,861 B2 | * | 4/2006 | Martling ..................... 60/737 |
| 7,182,281 B2 | * | 2/2007 | Catasus-Servia .......... 239/585.1 |
| 2008/0053062 A1 | | 3/2008 | Tuttle |
| 2008/0072602 A1 | | 3/2008 | Wasif et al. |
| 2008/0105237 A1 | | 5/2008 | Gandza |
| 2009/0139237 A1 | * | 6/2009 | Sullivan et al. ............. 60/737 |

FOREIGN PATENT DOCUMENTS

| | | |
|---|---|---|
| JP | S5793636 A | 6/1982 |
| JP | H11304152 A | 11/1999 |
| JP | 2000074371 A | 3/2000 |
| JP | 2003130352 A | 5/2003 |

OTHER PUBLICATIONS

Unofficial English translation of JP Decision to grant a Patent dated Nov. 26, 2013, issued in connection with corresponding JP Application No. 2009-247159.

* cited by examiner

Primary Examiner — Phutthiwat Wongwian
(74) Attorney, Agent, or Firm — Armstrong Teasdale LLP

(57) ABSTRACT

A fuel nozzle configured to channel fluid toward a combustion chamber within a gas turbine engine and a method for assembling the same are provided. The fuel nozzle includes a first hollow tube fabricated from a first material that has a first coefficient of thermal expansion and a second tube fabricated from a second material that has a second coefficient of thermal expansion that is different from the first coefficient of thermal expansion. The second tube is coupled within the first tube such that the first tube substantially circumscribes the second tube, and the second tube thermally expands approximately at a same rate as the first tube during fuel nozzle operation.

19 Claims, 4 Drawing Sheets

FUEL NOZZLE ASSEMBLY FOR USE WITH A GAS TURBINE ENGINE AND METHOD OF ASSEMBLING SAME

BACKGROUND OF THE INVENTION

The present invention relates generally to gas turbine engines and, more particularly, to fuel nozzle assemblies for use with gas turbine engines.

At least some known fuel nozzle assemblies used with gas turbine engines include tubular components that define internal passages. The variety of fluids that may flow through the internal passages may cause each tubular component to operate at different temperatures. The different temperatures may cause disparate thermal growths of the various tubular components, which may induce thermal strains. To relieve such thermal strains, at least some known fuel nozzle assemblies include a bellows assembly that facilitates compensating disparate thermal growths. A bellows assembly, however, generally increases the cost and complexity of manufacturing, handling, and maintaining the gas turbine engine.

BRIEF SUMMARY OF THE INVENTION

In one embodiment, a method for assembling a fuel nozzle for use with a gas turbine engine is provided. The method includes providing a first hollow tube fabricated from a first material that has a first coefficient of thermal expansion, providing a second hollow tube fabricated from a second material that has a second coefficient of thermal expansion that is different from the first coefficient of thermal expansion, and coupling the second tube within the first tube such that the first and second tube are oriented to channel fluids toward a combustion chamber. The first tube substantially circumscribes the second tube, and the second tube thermally expands approximately at a same rate as the first tube during fuel nozzle operation.

In another embodiment, a fuel nozzle configured to channel fluid towards a combustion chamber defined within a gas turbine engine is provided. The fuel nozzle includes a first hollow tube fabricated from a first material that has a first coefficient of thermal expansion and a second tube fabricated from a second material that has a second coefficient of thermal expansion that is different from the first coefficient of thermal expansion. The second tube is coupled within the first tube such that the first tube substantially circumscribes the second tube, and the second tube thermally expands approximately at a same rate as the first tube during fuel nozzle operation.

In yet another embodiment, a gas turbine engine is provided. The gas turbine engine includes a combustion chamber and a fuel nozzle configured to channel fluid toward the combustion chamber. The fuel nozzle includes a first tube and a second tube coupled within the first tube such that the first tube substantially circumscribes the second tube. The first tube is fabricated from a first material that has a first coefficient of thermal expansion, and the second tube is fabricated from a second material that has a second coefficient of thermal expansion that is different from the first coefficient of thermal expansion such that the second tube thermally expands approximately at a same rate as the first tube during fuel nozzle operation.

DETAILED DESCRIPTION OF THE INVENTION

A fuel nozzle assembly with a simple and inexpensive alternative to a bellows assembly is desired. The present invention facilitates the relief of axial and radial thermal strains while limiting the number of parts and joints necessary to facilitate such relief.

Figure 1:
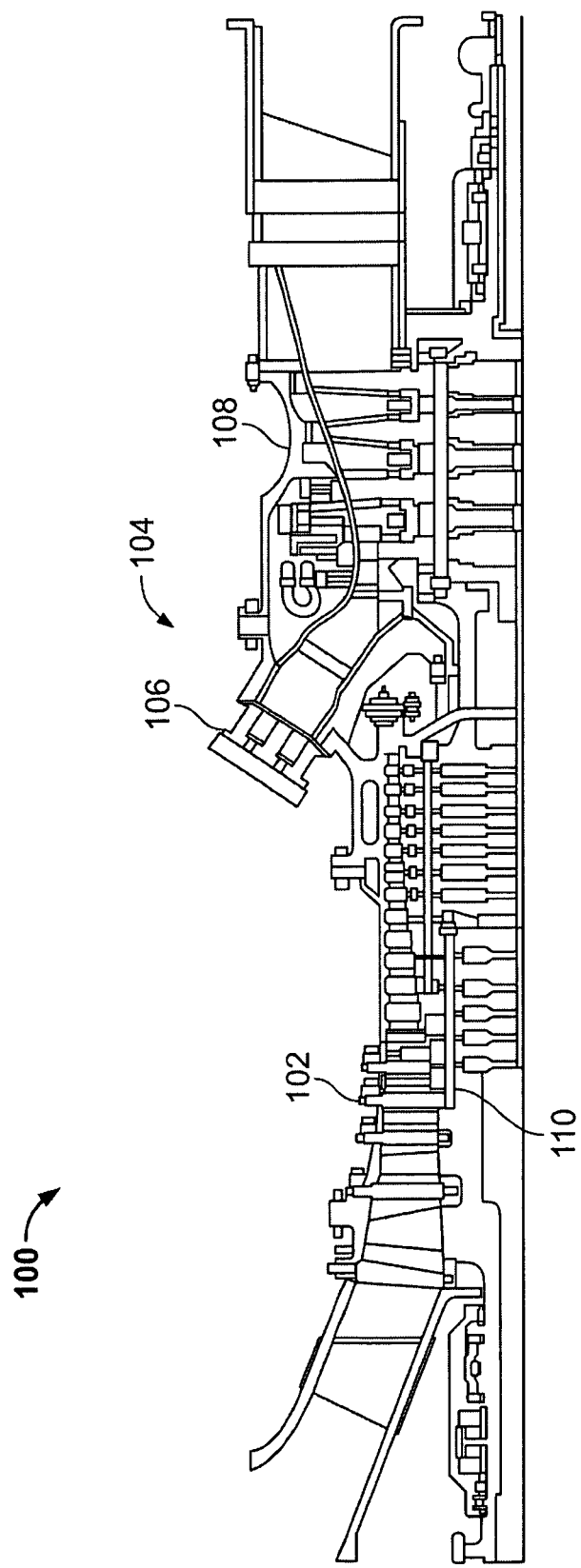
FIG. 1 is a schematic illustration of an exemplary gas turbine engine.

FIG. 1 is a schematic illustration of an exemplary gas turbine engine. Gas turbine engine 100 includes a compressor 102 and a combustor 104, which includes a fuel nozzle assembly 106. Gas turbine engine 100 also includes a turbine 108 and a common compressor/turbine shaft 110. In one embodiment, gas turbine engine 100 is a PG9371 9FBA Heavy Duty Gas Turbine Engine commercially available from General Electric Company, Greenville, S.C. Notably, the present invention is not limited to any one particular engine and may be used in connection with other gas turbine engines.

During operation, air flows through compressor 102 and compressed air is supplied to combustor 104 and, more specifically, to fuel nozzle assembly 106. Fuel is channeled to a combustion region defined within combustor 104, wherein the fuel is mixed with the compressed air and the mixture is ignited. Combustion gases generated are channeled to turbine 108, wherein gas stream thermal energy is converted to mechanical rotational energy. Turbine 108 is rotatably coupled to, and drives, shaft 110.

Figure 2:
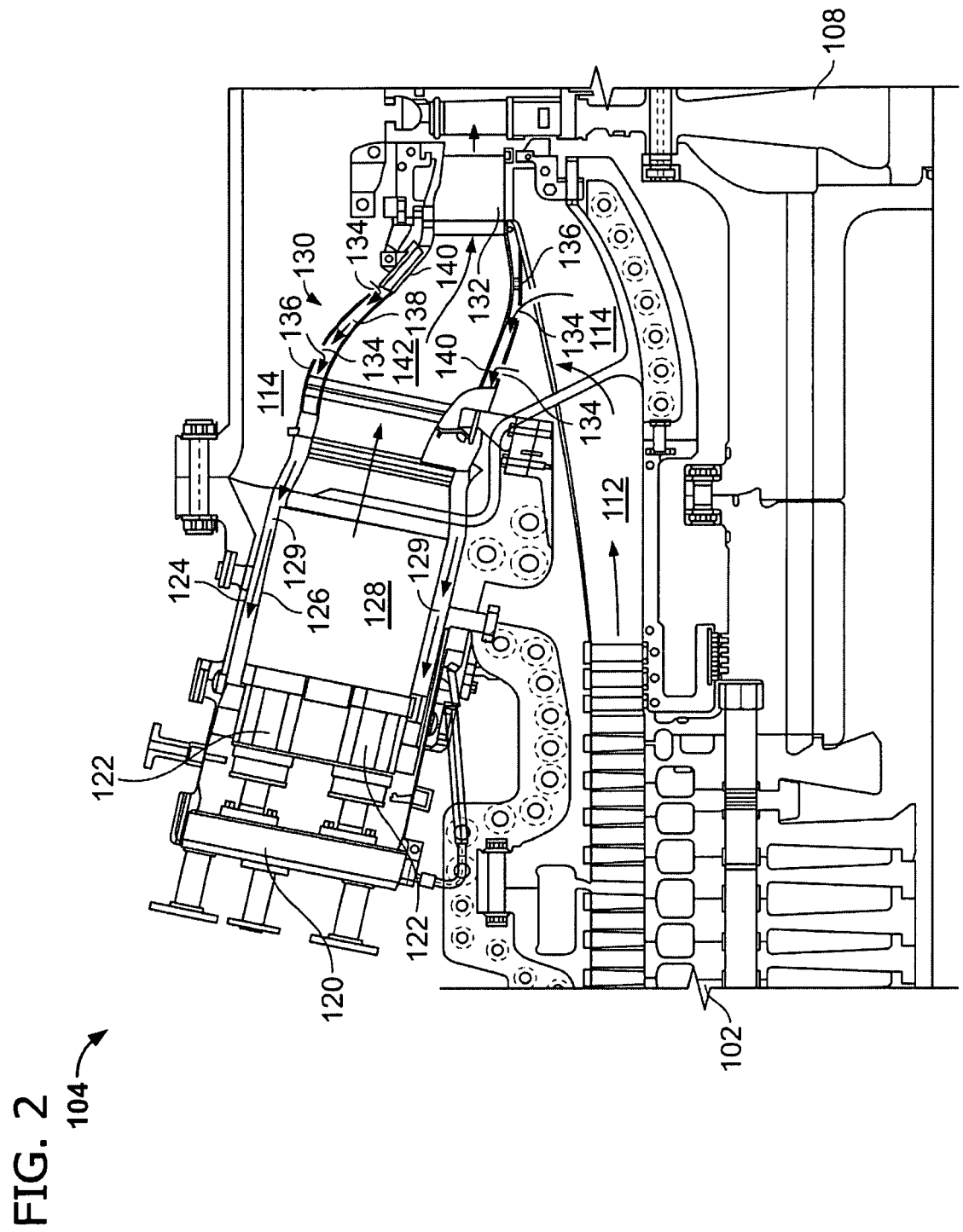
FIG. 2 is a cross-sectional schematic illustration of an exemplary combustor that may be used with the gas turbine engine shown in FIG. 1.

FIG. 2 is a cross-sectional schematic view of combustor 104. Combustor 104 is coupled in flow communication with compressor 102 and turbine 108. Compressor 102 includes a diffuser 112 and a compressor discharge plenum 114 that are coupled in flow communication with each other. Combustor 104 includes an end cover 120 that provides structural support to a plurality of fuel nozzle assemblies 122. End cover 120 is coupled to combustor casing 124 with retention hardware (not shown in FIG. 2). A combustor liner 126 is positioned radially inward from combustor casing 124 such that combustor liner 126 defines a combustion chamber 128 within combustor 104. An annular combustion chamber cooling passage 129 is defined between combustor casing 124 and combustor liner 126. A transition piece 130 is coupled to combustion chamber 128 to facilitate channeling combustion gases generated in combustion chamber 128 downstream towards turbine nozzle 132. In the exemplary embodiment, transition piece 130 includes a plurality of openings 134 defined in an outer wall 136. Transition piece 130 also includes an annular passage 138 that is defined between an inner wall 140 and outer wall 136. Inner wall 140 defines a guide cavity 142. In the exemplary embodiment, fuel nozzle assembly 122 is coupled to end cover 120 via a fuel nozzle flange (not numbered).

During operation, turbine 108 drives compressor 102 via shaft 110 (shown in FIG. 1). As compressor 102 rotates, compressed air is discharged into diffuser 112 as the associated arrows illustrate. In the exemplary embodiment, the majority of air discharged from compressor 102 is channeled through compressor discharge plenum 114 towards combustor 104, and the remaining compressed air is channeled for use in cooling engine components. More specifically, pressurized compressed air within discharge plenum 114 is channeled into transition piece 130 via outer wall openings 134 and into annular passage 138. Air is then channeled from annular passage 138 through annular combustion chamber cooling passage 129 and to fuel nozzle assemblies 122. Fuel and air are mixed, and the mixture is ignited within combustion chamber 128. Combustor casing 124 facilitates shielding combustion chamber 128 and its associated combustion processes from the outside environment, such as, for example, surrounding turbine components. Combustion gases generated are channeled from combustion chamber 128 through guide cavity 142 and towards turbine nozzle 132.

Figure 3:
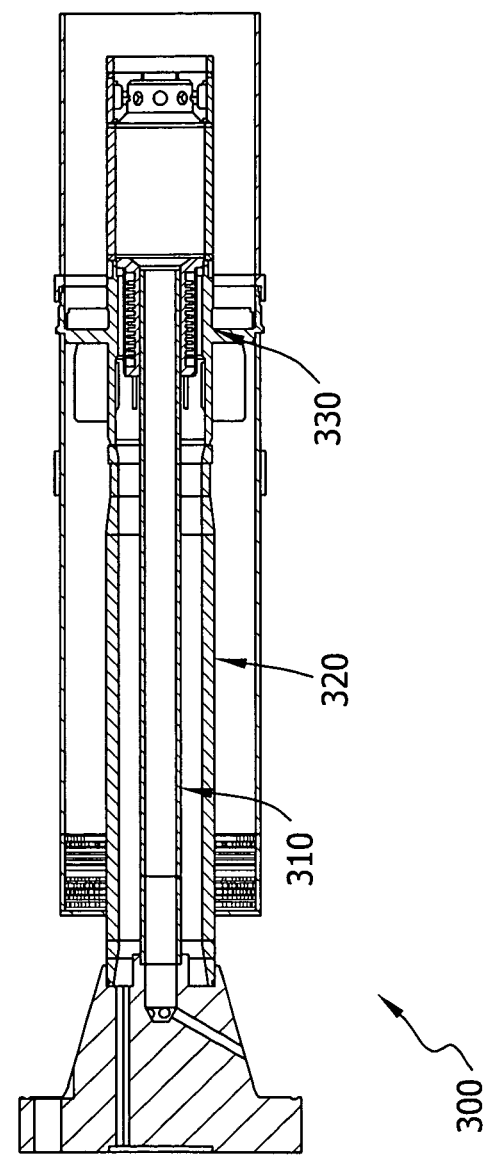
FIG. 3 is a cross-sectional schematic illustration of a known fuel nozzle assembly.

FIG. 3 is a cross-sectional schematic view of a known fuel nozzle assembly 300. Fuel nozzle assembly 300 includes two concentrically-aligned tubular components, inner tubular component 310 and outer tubular component 320, that define internal passages. In the exemplary embodiment, tubular components 310 and 320 are fabricated from the same material composition. The variety of fluids that may flow through the internal passages may cause tubular components 310 and 320 to operate at different temperatures.

Operating tubular components 310 and 320 at different temperatures may cause differential thermal growth, which may eventually induce fatigue cracks or joint failures. Such thermal strains are typically induced between tubular components 310 and 320 and their attachment joints. To relieve such thermal strains, fuel nozzle assembly 300 includes bellows assembly 330 that is fabricated from a different material composition than that of the tubular components 310 and 320.

In the exemplary embodiment, bellows assembly 330 includes a plurality of components (not shown) and a plurality of joints (not shown). The number of components and joints associated with bellows assembly 330 increases the cost and complexity of manufacturing, handling, and maintaining gas turbine engine 100 as compared to fuel nozzle assemblies without bellows assembly 330. For example, in one embodiment, bellows assembly 330 includes a thin bellows tubular component (not shown) that is coupled to end caps (not shown) via fillet welds (not shown). Moreover, thin bellows tubular component is coupled to at least one of tubular components 310 and 320 via brazing or welding. In one embodiment, shields and adaptors (not shown) are also coupled to bellows assembly 330 via welding to facilitate shielding bellows assembly 330 from mating parts.

Moreover, bellows assembly 330 accommodates axial thermal growth within fuel nozzle assembly 300, but accommodates radial thermal growth only at an attachment joint. To accommodate radial thermal growth within fuel nozzle assembly 300, additional bellows assemblies 330 are required. For example, in one embodiment, bellows assembly 330 is coupled to each axial end of at least one of tubular components 310 and 320. Incorporating additional bellows assemblies 330, however, increases the costs and complexity of manufacturing, handling, and maintaining gas turbine engine 100 as compared to fuel nozzle assemblies with fewer, or no, bellows assembly 330. Furthermore, the inclusion of additional materials when incorporating additional bellows assemblies 330 creates additional loading at the attachment joints.

Figure 4:
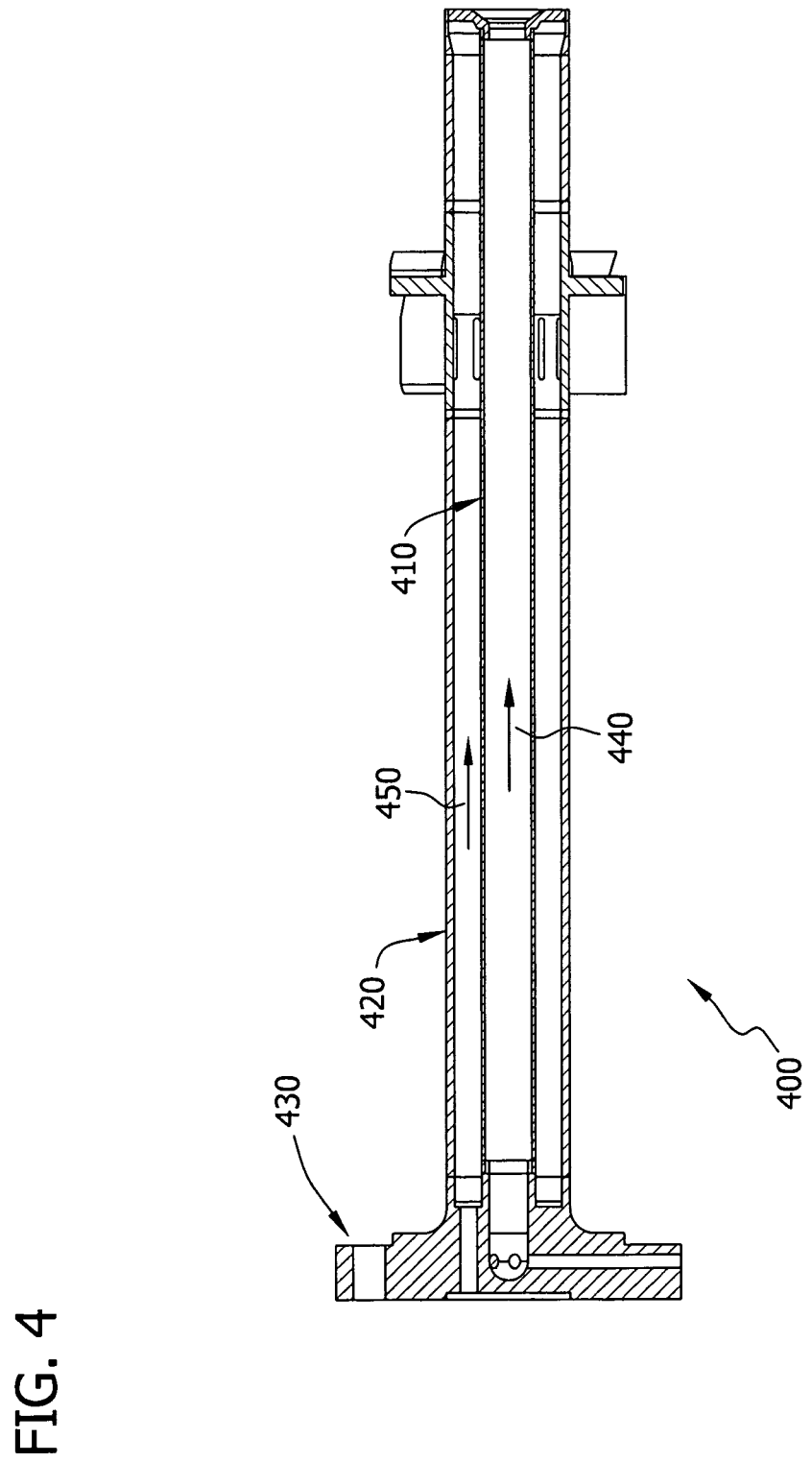
FIG. 4 is a cross-sectional schematic illustration of a fuel nozzle assembly that may be used with the combustor shown in FIG. 2.

FIG. 4 is a cross-sectional schematic view of an exemplary fuel nozzle assembly 400 that may be used with combustor 104 (shown above). As described in more detail below, fuel nozzle assembly 400 may reduce or eliminate the need for bellows assembly 330 (shown in FIG. 3) with a simple, low-load design.

In the exemplary embodiment, fuel nozzle assembly 400 includes two substantially concentrically-aligned tubular components, inner tubular component 410 and outer tubular component 420, with a distinct strength, durability, and coefficient of thermal expansion, as described in more detail below. Notably, while the exemplary embodiment includes two tubular components, it should be understood that the number of tubular components is not intended to limit the invention in any manner.

In the exemplary embodiment, tubular components 410 and 420 are substantially cylindrical and have a substantially circular cross-sectional profile. In alternative embodiments, at least one of tubular components 410 and/or 420 has a non-uniform profile configured to accommodate additional thermal displacement. For example, in one embodiment, at least one of tubular component 410 and/or 420 is a corrugated cylinder. Tubular components 410 and 420 are welded to end pieces, including a fuel nozzle tip (not numbered) and a flange 430, that provide robust braze joints. In one embodiment, tubular components 410 and 420 are electron beam welded to the fuel nozzle tip and flange 430. Tubular components 410 and 420 are oriented in the exemplary embodiment such that a single braze operation may be completed. Flange 430 provides additional support and robustness to fuel nozzle assembly 400. In one embodiment, flange 430 is fabricated from the same material composition as that of outer tubular component 420. In one embodiment, short sections of material adapters are welded at the axial ends of tubular components 410 and 420 to provide robustness at high temperatures or to enhance braze joint robustness.

Tubular components 410 and 420 define internal passages for a variety of fluids, including liquid, gas, and any mixture thereof. More specifically, inner tubular component 410 defines inner flow channel 440 and outer tubular component 420 defines outer flow channel 450. Generally, inner flow channel 440 is at a lower temperature than outer flow channel 450. For example, in one embodiment, inner tubular component 410 is used to channel fuel, and outer tubular component 420 is used to channel air. Because inner flow channel 440 is generally at a lower temperature than outer flow channel 450, each tubular component 410 and 420 generally operates at a different operating temperature. Thus, the material used in fabricating inner tubular component 410 is generally cooler than the material used in fabricating outer tubular component 420.

To facilitate reducing thermal strains caused by the differential temperatures of tubular components 410 and 420, outer tubular component 420 is fabricated from a material having a lower coefficient of thermal expansion than that of the material used in fabricating inner tubular component 410. The materials used in fabricating tubular components 410 and 420 are selected based at least in part on operating conditions of tubular components 410 and 420, including what fluids will channeled through tubular components 410 and 420. Specifically, the respective coefficient of thermal expansions of tubular components 410 and 420 are proportional such that tubular components 410 and 420 would expand a substantially similar axial distance at the respective operating temperatures. In one embodiment, outer tubular component 420 is fabricated from a 400 series stainless steel, such as a martensitic stainless steel or a ferritic stainless steel, and inner tubular component 410 is fabricated from a 300 series stainless steel, such as an austenitic stainless steel.

For example, in one embodiment, outer tubular component 420 has twice the increase in temperature than that of inner tubular component 410, but has approximately half of the rate of thermal expansion than that of inner tubular component 410. For a more specific example, in one embodiment, a resting temperature for tubular components 410 and 420 is approximately 70 degrees Fahrenheit, an operating temperature for inner tubular component 410 is approximately 360 degrees Fahrenheit, and an operating temperature for outer tubular component 420 is approximately 640 degrees Fahrenheit. In this embodiment, if inner tubular component 410 is fabricated from a material having a coefficient of thermal expansion of approximately 10 e-6 in/in/F, outer tubular component 420 would be fabricated from a material having a coefficient of thermal expansion of approximately 6.4 e-6 in/in/F to expand a substantially similar axial distance at the respective operating temperatures.

Considering the material compositions of the materials used in fabricating tubular components 410 and 420 and their respective strain ranges against low cycle fatigues ratios, the wall thicknesses of tubular components 410 and 420 are selected to be structurally strong enough to contain the internal pressure and vibration loads that may be induced by the fluids channeling therethrough. Moreover, the wall thicknesses of tubular components 410 and 420 are also selected to facilitate the necessary thermal differential growth without inducing additional loading to the attachment joints. For example, in one embodiment, outer tubular component 420 is typically two to four times thicker than inner tubular component 410. For a more specific example, in one embodiment, inner tubular component 410 is approximately 1/16 inch thick, and outer tubular component 420 is 1/8 to 1/4 inch thick or more.

The methods, apparatus, and systems for a fuel nozzle assembly described herein facilitate the operation of a gas turbine engine. More specifically, the fuel nozzle assembly described herein facilitates reducing thermal strains induced within the fuel nozzle assembly, while reducing the parts and joints necessary for assembly while maintaining structural robustness of the associated fuel nozzle assembly. Practice of the methods, apparatus, or systems described or illustrated herein is neither limited to a fuel nozzle assembly nor to gas turbine engines generally. Rather, the methods, apparatus, and systems described or illustrated herein may be utilized independently and separately from other components and/or steps described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Although specific features of various embodiments of the invention may be shown in some drawings and not in others, this is for convenience only. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A method for assembling a fuel nozzle for use with a gas turbine engine, said method comprising:
    providing a first hollow tube oriented to channel air through a first flow channel, wherein the first hollow tube is fabricated from a first material that has a first coefficient of thermal expansion, said first hollow tube oriented substantially linearly;
    providing a second hollow tube oriented to channel fuel through a second flow channel, wherein the second flow channel is at a lower temperature than the first flow channel, and is fabricated from only a second material that has a second coefficient of thermal expansion that is different from the first coefficient of thermal expansion, said second hollow tube oriented substantially linearly; and
    coupling the second tube within the first flow channel of the first tube such that the first and second tube are oriented to channel fluids toward a combustion chamber, wherein the first tube substantially circumscribes the second tube, wherein the second tube thermally expands approximately at a same rate as the first tube during fuel nozzle operation.

2. A method for assembling a fuel nozzle in accordance with claim 1 wherein said providing the second hollow tube further comprises providing the second hollow tube from the second material that has the second coefficient of thermal expansion that is greater than the first coefficient of thermal expansion.

3. A method for assembling a fuel nozzle in accordance with claim 1 wherein said coupling the second tube within the first tube further comprises coupling the second tube within the first tube such that the first and second tubes are substantially concentrically-aligned.

4. A method for assembling a fuel nozzle in accordance with claim 1 wherein said providing the first hollow tube further comprises providing the first hollow tube fabricated from a 400 series stainless steel.

5. A method for assembling a fuel nozzle in accordance with claim 1 wherein said providing the second hollow tube further comprises providing the second hollow tube fabricated from a 300 series stainless steel.

6. A fuel nozzle configured to channel fluid towards a combustion chamber defined within a gas turbine engine, said fuel nozzle comprising:
    a first hollow tube fabricated from a first material that has a first coefficient of thermal expansion, said first hollow tube comprises a first flow channel oriented to channel air through said first hollow tube, said first hollow tube oriented substantially linearly; and
    a second hollow tube fabricated from only a second material that has a second coefficient of thermal expansion that is different from the first coefficient of thermal expansion, said second tube comprises a second flow channel oriented to channel fuel through said second hollow tube, said second hollow tube oriented substantially linearly, said second flow channel at a lower temperature than the first flow channel, wherein said second tube is coupled within said first channel of said first tube such that said first tube substantially circumscribes said second tube, wherein said second tube thermally expands approximately at a same rate as said first tube during fuel nozzle operation.

7. A fuel nozzle in accordance with claim 6 wherein the first coefficient of thermal expansion is less than the second coefficient of thermal expansion.

8. A fuel nozzle in accordance with claim 6 wherein said first tube and said second tube are substantially concentrically-aligned.

9. A fuel nozzle in accordance with claim 6 wherein at least one of said first tube and said second tube is a right cylinder.

10. A fuel nozzle in accordance with claim 6 wherein at least one of said first tube and said second tube is a corrugated cylinder.

11. A fuel nozzle in accordance with claim 6 wherein the first material is a 400 series stainless steel.

12. A fuel nozzle in accordance with claim 6 wherein the second material is 300 series stainless steel.

13. A gas turbine engine comprising:
a combustion chamber; and
a fuel nozzle configured to channel fluid toward said combustion chamber, said fuel nozzle comprising a first tube comprising a first flow channel oriented to channel air through said first tube and a second tube coupled within said first flow channel of said first tube such that said first tube substantially circumscribes said second tube, said second tube comprises a second flow channel oriented to channel fuel through said second tube, said second flow channel at a lower temperature than said first flow channel, wherein said first tube is fabricated from a first material that has a first coefficient of thermal expansion, wherein said second tube is fabricated from only a second material that has a second coefficient of thermal expansion that is different from the first coefficient of thermal expansion, wherein said second tube thermally expands approximately at a same rate as said first tube during fuel nozzle operation, each of said first tube and said second tube oriented substantially linearly.

14. A fuel nozzle in accordance with claim 13 wherein the first coefficient of thermal expansion is less than the second coefficient of thermal expansion.

15. A fuel nozzle in accordance with claim 13 wherein said first tube and said second tube are substantially concentrically-aligned.

16. A fuel nozzle in accordance with claim 13 wherein at least one of said first tube and said second tube is a right cylinder.

17. A fuel nozzle in accordance with claim 13 wherein at least one of said first tube and said second tube is a corrugated cylinder.

18. A fuel nozzle in accordance with claim 13 wherein the first material is a 400 series stainless steel.

19. A fuel nozzle in accordance with claim 13 wherein the second material is 300 series stainless steel.

* * * * *